(12) United States Patent
McCloskey

(10) Patent No.: US 9,652,833 B2
(45) Date of Patent: May 16, 2017

(54) POINT SPREAD FUNCTION ESTIMATION FOR MOTION INVARIANT IMAGES

(71) Applicant: Honeywell International Inc., Morristown, NJ (US)

(72) Inventor: Scott McCloskey, Minneapolis, MN (US)

(73) Assignee: Honeywell International, Inc., Morristown, NJ (US)

( * ) Notice: Subject to any disclaimer, the term of this patent is extended or adjusted under 35 U.S.C. 154(b) by 413 days.

(21) Appl. No.: 14/218,595

(22) Filed: Mar. 18, 2014

(65) Prior Publication Data

US 2016/0171666 A1 Jun. 16, 2016

(51) Int. Cl.
G06K 9/40 (2006.01)
*G06T 5/00* (2006.01)
*G06T 5/50* (2006.01)
*G06T 7/20* (2017.01)
*G06T 7/13* (2017.01)

(52) U.S. Cl.
CPC ............... *G06T 5/003* (2013.01); *G06T 5/50* (2013.01); *G06T 7/13* (2017.01); *G06T 7/20* (2013.01); *G06T 2207/20201* (2013.01)

(58) Field of Classification Search
None
See application file for complete search history.

(56) References Cited

U.S. PATENT DOCUMENTS

| 7,561,186 | B2 * | 7/2009 | Poon | G06T 5/004 |
| | | | | 348/208.99 |
| 7,860,336 | B2 * | 12/2010 | Bando | H04N 1/4092 |
| | | | | 348/208.99 |
| 8,249,378 | B2 * | 8/2012 | Ono | G06T 5/002 |
| | | | | 382/255 |
| 8,837,853 | B2 * | 9/2014 | Tachi | H04N 5/217 |
| | | | | 382/263 |

(Continued)

FOREIGN PATENT DOCUMENTS

EP 1589479 A2 10/2005

OTHER PUBLICATIONS

Y. W. Tai, H. Du, M. S. Brown and S. Lin, "Correction of Spatially Varying Image and Video Motion Blur Using a Hybrid Camera," in IEEE Transactions on Pattern Analysis and Machine Intelligence, vol. 32, No. 6, pp. 1012-1028, Jun. 2010.*

(Continued)

*Primary Examiner* — Andrae S Allison
(74) *Attorney, Agent, or Firm* — Additon, Higgins & Pendleton, P.A.

(57) ABSTRACT

A method that includes using a point spread function to de-blur an original motion invariant image to create a modified motion invariant image; using an edge detector to find edges in the modified motion invariant image; determining the distances between the edges and corresponding artifacts in the modified motion invariant image; using the distances between the edges and the corresponding artifacts to estimate a velocity of an object in the modified motion (Continued)

invariant image; generating a corrected point spread function corresponding to the estimated velocity of the object; and using the corrected point spread function to de-blur the original motion invariant image and create a resulting image.

19 Claims, 3 Drawing Sheets

(56) References Cited

U.S. PATENT DOCUMENTS

| | | | | |
|---|---|---|---|---|
| 2001/0021224 | A1* | 9/2001 | Larkin | G06T 7/206 375/240.16 |
| 2003/0011717 | A1* | 1/2003 | McConica | H04N 5/23248 348/699 |
| 2004/0081335 | A1* | 4/2004 | Kondo | G06T 7/2053 382/107 |
| 2004/0102911 | A1* | 5/2004 | Roh | B25J 9/1692 702/85 |
| 2005/0231603 | A1 | 10/2005 | Poon | |
| 2008/0253676 | A1* | 10/2008 | Oh | H04N 5/23248 382/255 |
| 2012/0086822 | A1* | 4/2012 | Ishii | H04N 5/23258 348/208.6 |
| 2013/0271615 | A1* | 10/2013 | Webster | H04N 5/211 348/208.4 |
| 2015/0042829 | A1 | 2/2015 | McCloskey et al. | |

OTHER PUBLICATIONS

Scott McCloskey, Improved Motion Invariant Deblurring through Motion Estimation, Computer Vision—ECCV 2014, vol. 8692 of the series Lecture Notes in Computer Science pp. 75-89.*
Extended European Search Report in counterpart European Application No. 15151311.6 dated Sep. 4, 2015, pp. 1-7.
Agrawal, A., et al., "Coded exposure deblurring: Optimized codes for PSF estimation and invertibility", *IEEE Conference on Computer Vision and Pattern Recognition*, CVPR 2009, 2066-2073.
Agrawal, A., et al., "Optimal single image capture for motion deblurring", *IEEE Conference on Computer Vision and Pattern Recognition*CVPR 2009, (2009), 2560-2567.
Bando, Y., et al., "Near-Invariant Blur for Depth and 2D Motion via Time-Varying Light Field analysis", *ACM Transactions on Graphics*, 32(2), (2013), 13:1-13:15.
Cho, T. S, et al., "Motion blur removal with orthogonal parabolic exposures",*International Conference on Computational Photography*, (2010), 8 pgs.
Gupta, A., et al., "Single image deblurring using motion density functions", *Proceedings of the 11th European Conference on Computer Vision: Part I*, ECCV'10, (2010), 171-184.
Hays, J., et al., "IM2GPS: estimating geographic information from a single image", *IEEE Conference on Computer Vision and Pattern Recognition*, 2008. CVPR 2008, (2008), 8 pgs.
Josh, N., et al., "PSF Estimation Using Sharp Edge Prediction", *IEEE Conference on Computer Vision and Pattern Recognition*, 2008. CVPR 2008, 8 pgs.
Kohler, R., et al., "Recording and Playback of Camera Shake: Benchmarking Blind Deconvolution with a Real-World Database", *Computer Vision—ECCV 2012*, Lecture Notes in Computer Science vol. 7578, (2012), 27-40.
Krishnan, D., et al., "Fast Image Deconvolution using Hyper-Laplacian Priors", *Neural Information Processing Systems 2009*, Vancouver, (2009), 1-9.
Levin, A., et al., "Image and Depth from a Conventional Camera with a Coded Aperture", *ACM Transactions on Graphics*, 26(3), (Jul. 2007), 70-1-70-9.
Levin, A., et al., "Motion-Invariant Photography", *SIGGRAPH '08*, (2008), 9 pgs.
McCloskey, S., et al., "Design and estimation of coded exposure point spread functions", *IEEE Trans. Pattern Analysis and Machine Intelligence*, 34(10), (Oct. 2012), 2071-2077.
McCloskey, S., et al., "Motion Invariance and Custom Blur from Lens Motion", *2011 IEEE International Conference on Computational Photography (ICCP)*, (2011), 1-8.
McCloskey, S., "Velocity-Dependent Shutter Sequences for Motion Deblurring", *Proceedings, European Conference Computer Vision*, ECCV 2010, LNCS, vol. 6316, (2010), 309-322.
Nagahara, H., et al., "Flexible Depth of Field Photography", *Proceedings, European Conference Computer Vision*, ECCV 2008, Part IV, LNCS vol. 5305 (2008), 60-73.
Raskar, R., et al., "Coded exposure photography: motion deblurring using fluttered shutter", *International Conference on Computer Graphics and Interactive Techniques*, ACM SIGGRAPH 2006 Papers(2006), 795-804.
Sonoda, T., et al., "Motion-Invariant coding using a programmable aperture camera", *Proceedings of the 11th Asian Conference on Computer Vision—vol. Part IV*, ACCV'12, (2012), 379-391.
Veeraraghavan, A., et al., "Dappled photography: Mask enhanced cameras for heterodyned light fields and coded aperture refocusing", *SIGGRAPH '07, ACM SIGGRAPH 2007 Papers*, (2007), 1-12.
Webster, S., et al., "Improved motion invariant imaging with time varying shutter functions", *Proceedings of SPIE-IS&T Electronic Imaging*, SPIE vol. 7876, (2011), 787604-787604-8.
Whyte, O., et al., "Non-uniform deblurring for shaken images", *International Journal of Computer Vision*, 98(2), (2012), 168-186.
Xu, Li, et al., "Two-Phase Kernel Estimation for Robust Motion Deblurring", *Proceedings of the 11th European Conference on Computer Vision: Part I*, ECCV '10, LNCS vol. 6311, (2010), 157-170.

* cited by examiner

POINT SPREAD FUNCTION ESTIMATION FOR MOTION INVARIANT IMAGES

GOVERNMENT FUNDING

The work described herein was funded, in whole or in part, by U.S. Army RDECOM, Contract No. W911NF-11-C-0253. The United States Government has certain rights in the invention.

BACKGROUND

There are a variety of industrial systems (e.g., barcode scanning, license plate reading, and biometric identification) where an image is obtained by a camera and then subjected to assorted processes depending on the type of industrial system. The quality of images that are captured by a camera is commonly a limiting factor on overall system performance.

One of more common issues with obtaining images is motion blur, which may be severely limiting to subsequent images processing and/or analysis. As an example, with a standard 13 mil UPC barcode, the motion of a single narrow bar over the course of exposure may reduce the contrast that is needed at the spatial frequency to 0% thereby causing scanning to fail.

Motion blur is a growing concern in many industrial systems as modern cameras are increasingly moving towards lower cost rolling shutter sensors. The alternative to lower cost rolling shutter sensors is using more expensive global shutter sensors.

The more expensive global shutter sensors typically provide the camera with the opportunity to illuminate the target with a high-powered flash. Illuminating the target with a high-powered flash is possible due to the overlapping exposure of each row in the image that results from using global shutter sensors. The partially-overlapping rolling shutter timing often require more power to operate the high-powered flash than is typically available, especially in power-constrained applications (e.g., barcode scanners operating on power through a USB port). As such, there is a need for systems and methods that address motion blur for various industrial imaging applications.

OVERVIEW

The systems and methods described herein may address motion blur by modifying the image capture device and by adding image post-processing. The image capture device may not eliminate motion blur in the captured image, but may instead make subsequent post-processing of the image numerically stable.

Numerically stable post-processing of the image may allow for image reconstruction with fewer artifacts than traditional images. This improved image reconstruction is in contrast to existing systems where even when there is very moderate motion blur, the image may be useless for recognition (even if the best known de-blurring is techniques are applied).

One of the reasons that even the best known de-blurring techniques may be inadequate is because traditional image capture mechanisms typically impose un-invertible motion blur. In the field of computational photography, the challenges raised by un-invertible motion blur are commonly addressed by capturing images with invertible motion blur and then subjecting these captured images to various post-processing techniques.

The systems and methods described herein may provide an improved motion invariant imaging approach. In some of the systems and methods described herein, one or more elements of the optical system (e.g., a stabilizing lens) may be moved in a parabolic trajectory during image capture. Moving one or more elements of the optical system in such a manner may cause the targeted objects that are moving with any velocity (within a certain range) to appear to be blurred with roughly the same Point Spread Function (PSF). This rough invariance means that there is no need for pre-exposure motion estimation, as is required using conventional techniques (e.g., fluttering shutter).

One of the associated drawbacks with existing motion invariant approaches is that the approximate nature of the invariance results in certain artifacts appearing in the de-blurred image. Even though these artifacts are significantly less severe than the traditional approach, they may cause limited iris recognition (among other drawbacks).

The systems and methods described herein may estimate an object's speed from the motion invariant image. As an example, by using parabolic lens motion, an image is captured without the need for pre-exposure velocity estimation. In addition, by estimating the exact PSF there may be a reduction in deconvolution artifacts.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
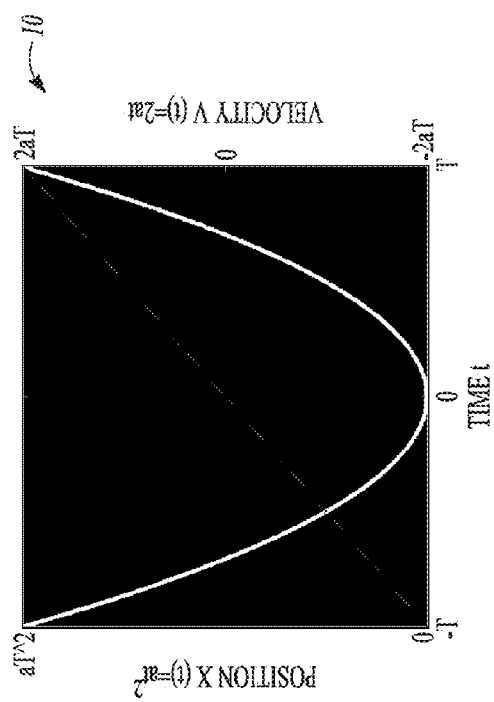
FIG. 1 shows parabolic motion and lens velocity (the derivative of x), illustrating where the range of object velocities within an image are stabilized during exposure.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The systems and methods described herein may determine a more accurate PSF for an image (or a segmented region of the image). One of the assumptions that is associated in part with the systems and methods described herein is that the artifacts in modified motion invariant images are themselves indicative of the target's motion. Therefore, a stationary object may appear artifact-free, and a moving object may have ghost edge artifacts at a distance from the true edge which depends on the speed of a moving object in the motion invariant image.

In addition, the systems and methods described herein may model artifacts as a convolution of the desired latent image with an error PSF to demonstrate that the spatial scale of these artifacts corresponds to the object velocity. Despite the use of parabolic motion to capture an image in which blur is invariant to motion, the motion invariant image may be used to estimate object motion post-capture.

In some forms, real camera images may be used to demonstrate significant reductions in the artifacts by using the estimated motion for de-blurring. The systems and methods described herein may also result in a 96% reduction in reconstruction error via simulation with a large test set of photographic images.

Motion invariance may be implemented when using a camera by translating any of the camera body, sensor, or lens with constant acceleration. Optical stabilization hardware may be used to implement motion invariance by lens motion.

As an example, in a 1D case, the lens moves along a line in the direction of expected motion (i.e., horizontal lens motion with initial rightward velocity). At the beginning of the image's exposure, the lens translates right with a given velocity, and constant (negative) acceleration is applied.

During an exposure duration of 2T milliseconds, with the time variable $t \in [-T, T]$ for mathematical convenience, the acceleration causes the lens to come to a stop at $t=0$ and, at the end of the exposure period ($t=T$), the lens has returned to its initial position with the same velocity magnitude (but in the opposite direction) as in the beginning. Though the motion of the lens is linear, this pattern is referred to as parabolic motion because the horizontal position x is a parabolic function of time t, $$x(t) = at^2.$$

FIG. 1 show plots 10 of parabolic motion (solid line) and lens velocity (dashed line, the derivative of x), illustrating the range of object velocities which are stabilized during exposure. Blur in a motion invariant image is modeled as the convolution of a latent image I with a PSF B, giving the blurred image $$I_b = I * B + n,$$

where n represents noise.

In some forms of the systems and methods described herein, edges in the image may be used to infer the scale of the PSF. As an example, by checking for pronounced sign changes in the average gradient magnitude of pixels over a range of horizontal distances from edge points in the image, the scale of the PSF may be determined. If the object attached to the edge was moving ($s \neq 0$), there will be a zero-crossing of the gradient at a distance of $aT^2$ from the edge, and additional zero-crossings separated by 2sT.

Figure 2:
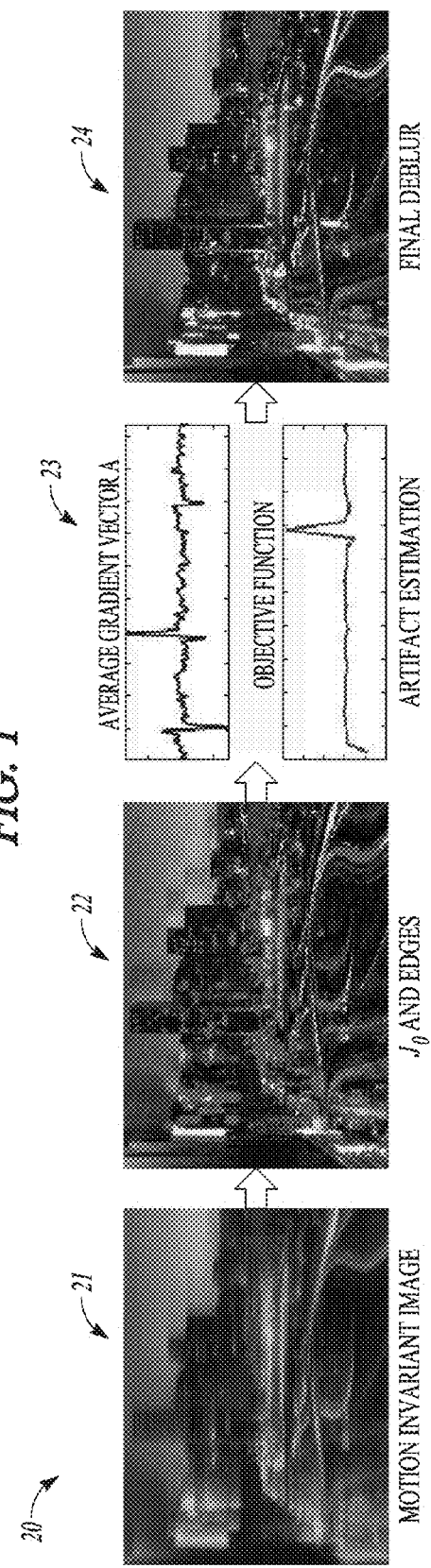
FIG. 2 is a flow diagram illustrating images that may be generated during some of the example methods described herein.

FIG. 2 illustrates a series 20 of example images that may be created during the following example method:

1. Compute modified motion invariant image estimate $J_0$ (see box 21 in FIG. 2).
2. Find vertical edges in $J_0$ using the Sobel detector. Discard edge points below the 80th percentile strength (see box 22 in FIG. 2).
3. Compute $$H = \frac{dJ_0}{dx}.$$

4. Compute the average gradient sign vector A (see box 23 in FIG. 2), weighted by the strength of edge points x, as $$A(i) = \frac{\Sigma_x |H(x)| \operatorname{sign}(H(x+i))}{\Sigma_x |H(x)|}$$

5. If $\Sigma_{x=aT^2-1}^{aT^2+1} A(x)^2 < \tau$, $\tilde{s}=0$ and return; else $$\tilde{s} = \operatorname{argmax}_{s \in S} \sum A \cdot \frac{dE_s}{dx}.$$

As an example, a threshold of $\tau = 5*10^{-10}$ may be used to determine whether there is a zero-crossing at $aT^2$. The space of potential velocities is quantized to the set S such that consecutive values shift the peaks in the error PSF E by 1 pixel and $s \leq 2aT$, which is the maximum velocity that the lens stabilized.

6. Apply calculations to create final deblurred image (see box 24 in FIG. 2).

Example #1

Uniform blur PSFs was applied to represent a range of velocities to images from a dataset in order to quantify motion estimation performance and image quality improvement. In order to avoid the small sample size issues associated with presenting only real camera results, this example utilized 163 landscape-oriented images from a test set. The entire example image (see box 21 in FIG. 2) was synthetically blurred using the PSF $B_s$, with T=50 ms (i.e., a 100 ms exposure time), a=0:041, and s uniformly sampled in [0; 2aT]. 21 different values of s were tested for each image. Blur is simulated and two levels of Gaussian white noise n with $\sigma=1$ and 2:5 relative to 8 bit intensity values were tested.

Under the $\sigma=1$ case, s was estimated to within the resolution in 3,346 of 3,423 cases (98%). As an example, under the $\sigma=2.5$ condition, 3,299 of 3,423 cases (96%) were within resolution. Most of the errors come from two types of example images where the method estimates $\tilde{s}=0$. In one example type of image, the 'latent image' contains some motion blur—a clear violation of the prior natural image. In the second example type of image, there are no strong edges from which to estimate motion.

Table 1 shows the computed Root Mean Squared Error (RMSE) between the reference latent image and motion invariant images de-blurred using $B_0$ (showing the performance of existing MI de-blurring), $B_{\tilde{s}}$, (i.e., an estimate provided by the example methods described herein), and $B_s$ (i.e., the ground truth PSF and lower bound of RMSE). The rows in Table 1 show separate noise conditions. In addition, separate RMSE performance is shown for those cases where our motion estimate is inaccurate.

TABLE 1

| Noise | test cases | $B_0$ | $B_{\tilde{s}}$ | $B_s$ |
|---|---|---|---|---|
| σ = 1 | all | 14.52 | 10.77 | 10.66 |
| σ = 1 | $\tilde{s} \neq s$ | 14.75 | 15.40 | 10.48 |
| σ = 2.5 | all | 18.96 | 16.24 | 16.11 |
| σ = 2.5 | $\tilde{s} \neq s$ | 18.99 | 19.53 | 16.01 |

When averaged over all image/velocity combinations, the use of the estimate in de-blurring as determined by the example methods described herein eliminates 96% of the RMSE relative to the use of the ground truth s. In the very few cases where the velocity estimate was off by one or more quantization level $\tilde{s} \neq s$), the resulting RMSE is only slightly worse than the RSME obtained using conventional methods.

Example #2

Motion invariant images were captured using a Canon 60D camera with a 100 mm image stabilization lens which has been modified to execute parabolic motion during exposure. The invariant camera was a stock Canon 60D DSLR body with a modified Canon EF 100 mm f/2.8L Macro IS lens. The standard mode of operation for image stabilization was a closed control loop where motion detected by sensors within the lens induces a compensating motion of the stabilizing element.

Lens motion is achieved by modulating electromagnets, and its position is recorded using two embedded position sensors. In order to drive the lens to parabolic motion, we break the control loop and decouple the stabilizing element from the motion sensor.

An independent Texas Instruments MSP430F2618 microprocessor was added which controls motion through pulse width modulation, and monitors its progress by reading the position sensors through 12-bit ADCs. Control loops running on the microcontroller execute the desired parabolic motion, which is synchronized with the camera's shutter via a hot shoe trigger.

While the stabilizing lens accurately traces the desired parabolic trajectory, the real image PSFs differed from the analytic form due to a delay in the start of motion. The issue is that motion in our camera starts based on the camera body's hot shoe, which is designed for flash triggering.

In order to avoid flash synchronization issues—particularly a flash firing when the shutter is not completely open—the hot shoe's first signal occurs when the first curtain is completely open. The transit of the shutter blade on the Canon 60D DSLR body from bottom to top takes about 4 ms, so the lens will be stationary for as much as the first 4 ms of exposure. When estimating blur using images from the Canon 60D DSLR, an additional delay term was added in B to model the correct error PSFs.

Despite the use of parabolic motion to capture an image in which blur is decoupled from an object's velocity, the systems and methods described herein may provide a motion estimation using motion invariant images. The systems and methods described herein may also determine which PSF should be de-convolved to significantly reduce both quantitative RMSE and the severity of motion invariant artifacts.

The ability to determine which PSF should be de-convolved to significantly reduce both quantitative RMSE and the severity of motion invariant artifacts was demonstrated in Examples using both a large-scale synthetic experiment and validation with real camera images. The systems and methods described herein may get the benefit of de-convolving the exact PSF (i.e., in 96+% of cases where motion is accurately estimates) without the need for pre-exposure velocity estimation. One important factor in the systems and methods described herein is modeling artifacts and quantifying the relationship between velocity and the spacing of these artifacts.

The systems and methods described herein may achieve better image quality without the need for additional hardware elements or associated light loss. In addition, the camera described in Example #2 does not introduce additional elements in the optical path, and therefore maintains high light throughput.

Figure 3:
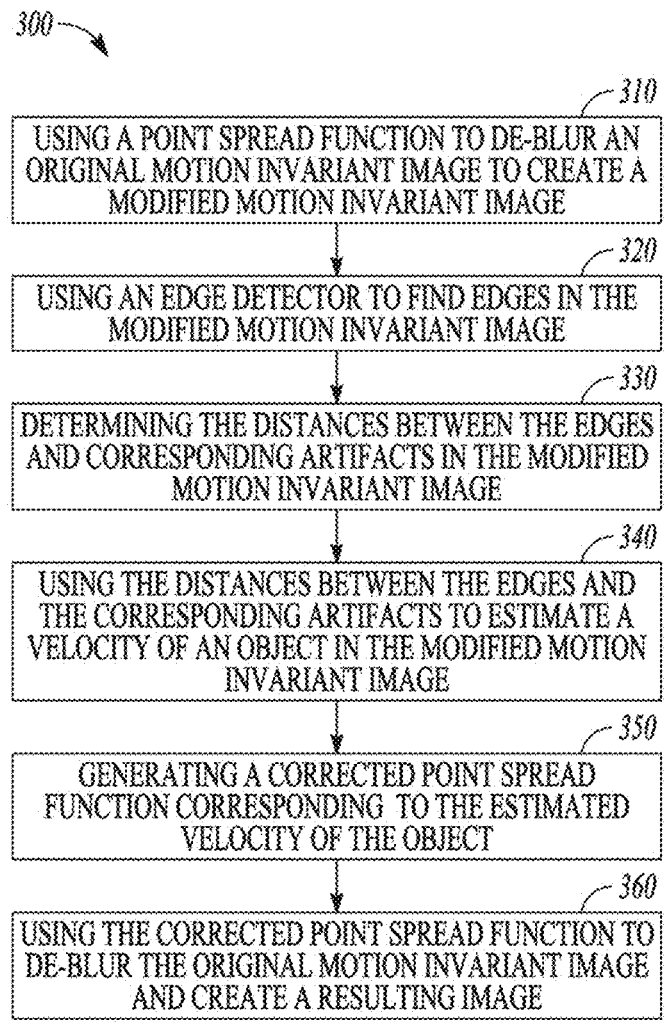
FIG. 3 illustrates a flow diagram of an example method of deblurring an image.

FIG. 3 illustrates a flow diagram of an example method [300] of deblurring an image. The method [300] includes [310] using a point spread function to de-blur an original motion invariant image to create a modified motion invariant image; [320] using an edge detector to find edges in the modified motion invariant image: [330] determining the distances between the edges and corresponding artifacts in the modified motion invariant image; [340] using the distances between the edges and the corresponding artifacts to estimate a velocity of an object in the modified motion invariant image; [350] generating a corrected point spread function corresponding to the estimated velocity of the object; and [360] using the corrected point spread function to de-blur the original motion invariant image and create a resulting image.

As an example, [310] using a point spread function to de-blur an original motion invariant image to create a modified motion invariant image may include using a point spread function corresponding to a stationary object in the original motion invariant image.

As another example, [320] using an edge detector to find edges in the modified motion invariant image may include using an edge detector to find edges of at least one object in the modified motion invariant image. In addition, using an edge detector to find edges of at least one object in the modified motion invariant image may include detecting edges in a specific region of the modified motion invariant image. As discussed above, a Sobel edge detector may be used to find edges (among other edge detectors).

As another example, [330] determining the distances between the edges and corresponding artifacts in the modified motion invariant image may include using changes in pixel intensity over a range of positions in the modified motion invariant image.

As another example, [340] using the distances between the edges and the corresponding artifacts to estimate a velocity of an object in the modified motion invariant image may include using a data table to retrieve the estimated velocity based on the distance. In addition, motion sensors (e.g., accelerometers and gyroscopes) in the lens may be used to estimate any motion of the camera during exposure.

As another example, [350] generating the corrected point spread function corresponding to the estimated velocity of the object may include generating the corrected point spread function corresponding to multiple velocity estimates where each of the velocity estimates has a corresponding probability.

As another example, [360] using the corrected point spread function to de-blur the original motion invariant image and create a resulting image may include performing image processing by one of several possible non-blind deconvolution techniques.

Figure 4:
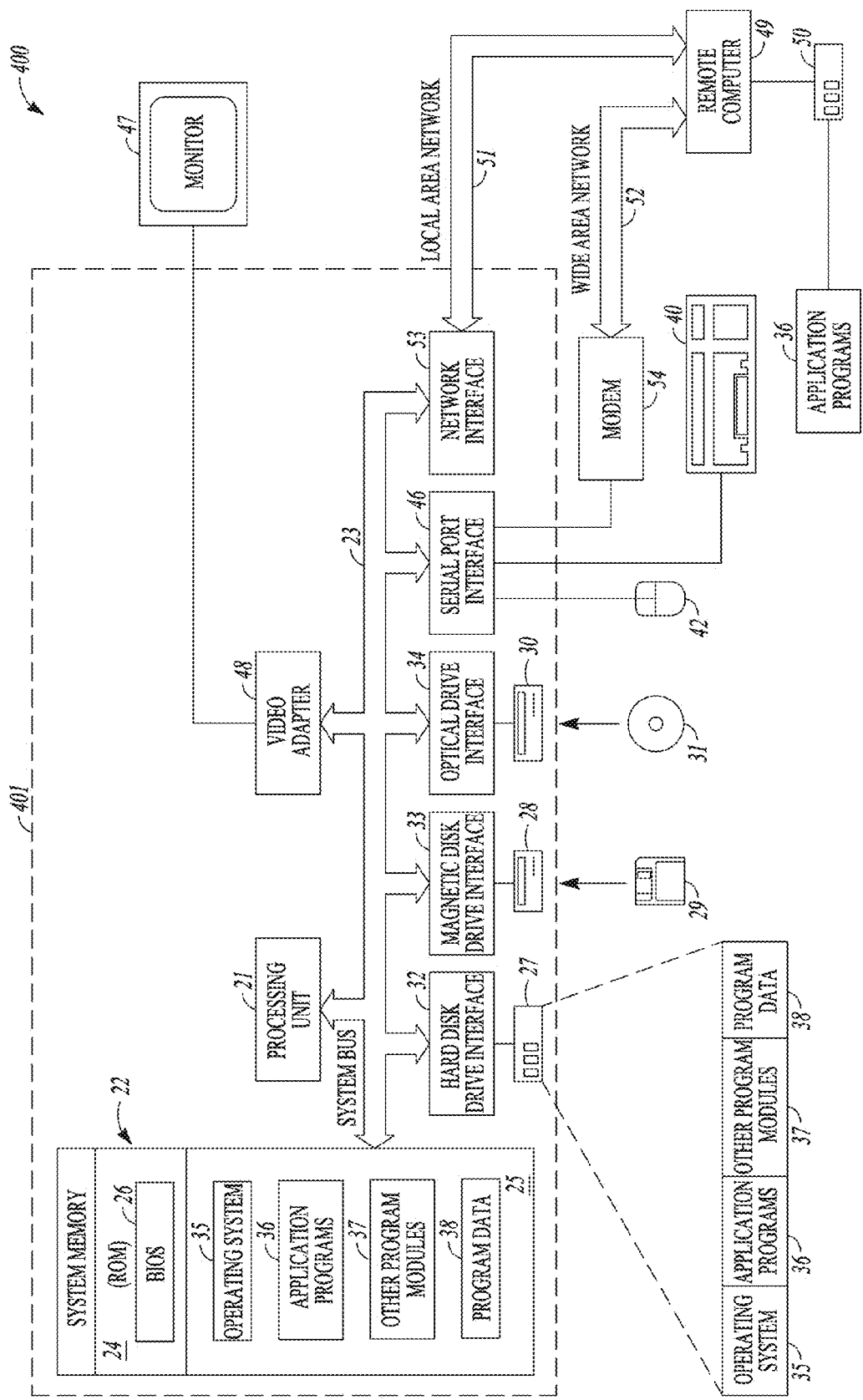
FIG. 4 is a block diagram of a computer system that may be configured to implement the various methods described herein.

FIG. 4 is a block diagram of a computer system that may be configured to implement the various methods described herein. In the example shown in FIG. 4, a hardware and operating environment is provided that may be specifically programmed to implement the methods and system described herein.

As shown in FIG. 4, one example of the hardware and operating environment includes a general purpose computing device in the form of a computer 401 (e.g., a personal computer, workstation, or server), including one or more processing units 21 (e.g., processor circuits), a system memory 22, and a system bus 23 that operatively couples various system components including the system memory 22 to the processing unit 21. There may be only one or there may be more than one processing unit 21, such that the processor of computer 401 comprises a single central-processing unit (CPU), or a plurality of processing units, commonly referred to as a multiprocessor or parallel-processor environment. In various embodiments, computer 401 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 401, such as during start-up, may be stored in ROM 24. The computer 401 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 401. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or method described herein may be resident on any one or number of these computer-readable media.

A user may enter commands and information into computer 401 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 401 may operate in a networked environment using logical connections to one or more remote computers or servers, such as remote computer 49. These logical connections are achieved by a communication device coupled to or a part of the computer 401; the invention is not limited to a particular type of communications device. The remote computer 49 can be another computer, a server, a router, a network PC, a client, a peer device or other common network node, and typically includes many or all of the elements described above I/O relative to the computer 401, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 401 is connected to the LAN 51 through a network interface or adapter 53, which is one type of communications device. In some embodiments, when used in a WAN-networking environment, the computer 401 typically includes a modem 54 (another type of communications device) or any other type of communications device, e.g., a wireless transceiver, for establishing communications over the wide-area network 52, such as the internet.

The methods described herein may include or use subject matter (such as an apparatus, a method, a means for performing acts, or a device readable medium including instructions that, when performed by the device, may cause the device to perform acts), such as can include or use a system that includes a processor circuit. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electronic system, comprising:
    a processor; and
    a memory device coupled to the processor and having a program stored thereon for execution by the processor to:
    use a point spread function to de-blur an original motion invariant image to create a modified motion invariant image;
    use an edge detector to find edges in the modified motion invariant image;
    determine the distances between the edges and corresponding artifacts in the modified motion invariant image;
    use the distances between the edges and the corresponding artifacts to estimate a velocity of an object in the modified motion invariant image;
    generate a corrected point spread function corresponding to the estimated velocity of the object; and
    use the corrected point spread function to de-blur the original motion invariant image and create a resulting image.

2. The system of claim 1, wherein the processor-readable medium includes instructions that, when performed by the processor, configure the system to use a point spread function to de-blur an original motion invariant image to create a modified motion invariant image by using a point spread function corresponding to a stationary object in the original motion invariant image.

3. The system of claim 1, wherein the processor-readable medium includes instructions that, when performed by the processor, configure the system to use an edge detector to find edges in the modified motion invariant image by using an edge detector to find edges of at least one object in the modified motion invariant image.

4. The system of claim 3, wherein the processor-readable medium includes instructions that, when performed by the processor, configure the system to use an edge detector to find edges of at least one object in the modified motion invariant image by detecting edges in a specific region of the modified motion invariant image.

5. The system of claim 1, wherein the processor-readable medium includes instructions that, when performed by the processor, configure the system to determine the distances between the edges and corresponding artifacts in the modified motion invariant image by using changes in pixel intensity over a range of positions in the modified motion invariant image.

6. The system of claim 1, wherein the processor-readable medium includes instructions that, when performed by the processor, configure the system to use the distances between the edges and the corresponding artifacts to estimate the velocity of the object in the modified motion invariant image by using the data table to retrieve the estimated velocity based on the distance.

7. A method, comprising:
    using a point spread function to de-blur an original motion invariant image to create a modified motion invariant image;
    using an edge detector to find edges in the modified motion invariant image;
    determining the distances between the edges and corresponding artifacts in the modified motion invariant image;
    using the distances between the edges and the corresponding artifacts to estimate a velocity of an object in the modified motion invariant image;
    generating a corrected point spread function corresponding to the estimated velocity of the object; and
    using the corrected point spread function to de-blur the original motion invariant image and create a resulting image.

8. The method of claim 7 wherein using a point spread function to de-blur an original motion invariant image to create a modified motion invariant image includes using a point spread function corresponding to a stationary object in the original motion invariant image.

9. The method of claim 7 wherein using an edge detector to find edges in the modified motion invariant image includes using an edge detector to find edges of at least one object in the modified motion invariant image.

10. The method of claim 9 wherein using an edge detector to find edges of at least one object in the modified motion invariant image includes detecting edges in a specific region of the modified motion invariant image.

11. The method of claim 7 wherein determining the distances between the edges and corresponding artifacts in the modified motion invariant image includes using changes in pixel intensity over a range of positions in the modified motion invariant image.

12. The method of claim 7, wherein generating the corrected point spread function corresponding to the estimated velocity of the object includes generating the corrected point spread function corresponding to multiple velocity estimates, wherein each of the velocity estimates has a corresponding probability.

13. A computer-readable storage device having instructions for causing a computer to implement a method, the method comprising:
- using a point spread function to de-blur an original motion invariant image;
- using an edge detector to find edges in the modified motion invariant image;
- determining the distances between the edges and corresponding artifacts in the modified motion invariant image;
- using the distances between the edges and the corresponding artifacts to estimate a velocity of an object in the modified motion invariant image;
- generating a corrected point spread function corresponding to the estimated velocity of the object; and
- using the corrected point spread function to de-blur the original motion invariant image and create a resulting image.

14. The computer-readable storage device of claim 13, the device having instructions for causing the computer to implement the method, wherein using a point spread function to de-blur an original motion invariant image to create a modified motion invariant image includes using a point spread function corresponding to a stationary object in the original motion invariant image.

15. The computer-readable storage device of claim 13, the device having instructions for causing the computer to implement the method, wherein using an edge detector to find edges in the modified motion invariant image includes using an edge detector to find edges of at least one object in the modified motion invariant image.

16. The computer-readable storage device of claim 15, the device having instructions for causing the computer to implement the method, wherein using an edge detector to find edges of at least one object in the modified motion invariant image includes detecting edges in a specific region of the modified motion invariant image.

17. The computer-readable storage device of claim 13, the device having instructions for causing the computer to implement the method, wherein determining the distances between the edges and corresponding artifacts in the modified motion invariant image includes using changes in pixel intensity over a range of positions in the modified motion invariant image.

18. The computer-readable storage device of claim 13, the device having instructions for causing the computer to implement the method, wherein using the distances between the edges and the corresponding artifacts to estimate the velocity of the object in the modified motion invariant image includes using the data table to retrieve the estimated velocity based on the distance.

19. The computer-readable storage device of claim 13, the device having instructions for causing the computer to implement the method, wherein generating the corrected point spread function corresponding to the estimated velocity of the object includes generating the corrected point spread function corresponding to multiple velocity estimates, wherein each of the velocity estimates has a corresponding probability.

* * * * *